United States Patent

[11] 3,607,857

| [72] | Inventor | John W. Nelson |
| | | Kalamazoo, Mich. |
| [21] | Appl. No. | 16,225 |
| [22] | Filed | Mar. 3, 1970 |
| [45] | Patented | Sept. 21, 1971 |
| [73] | Assignee | The Upjohn Company |
| | | Kalamazoo, Mich. |
| | | Continuation-in-part of application Ser. No. 812,404, Apr. 1, 1969, now abandoned. |

[54] PROCESS OF REMOVING ACRINOL FROM GAMMA GLOBULIN USING SILICEOUS MATERIAL SUCH AS SILICA GEL
9 Claims, No Drawings

| [52] | U.S. Cl. | 260/112, 424/177 |
| [51] | Int. Cl. | C07g 7/00 |
| [50] | Field of Search | 260/112 B; 424/101, 177 |

[56] References Cited
UNITED STATES PATENTS

| 3,301,842 | 1/1967 | Schultze et al. | 260/112 |
| 3,382,227 | 5/1968 | West et al. | 260/112 |
| 3,449,316 | 6/1969 | Querry | 260/112 |

Primary Examiner—William H. Short
Assistant Examiner—Howard Schain
Attorney—John Kekich ABSTRACT: Removal of acrinol (ethacridine lactate monohydrate) from blood proteins, especially Y-globulin, is accomplished by treating aqueous acrinol solutions of the proteins with a siliceous material which preferentially absorbs the acrinol. Free of acrinol, Y-globulin from sera or plasma especially immune sera or plasma is useful in combatting rejection of tissue and organ transplants and in replacement management of gamma globulin.

PROCESS OF REMOVING ACRINOL FROM GAMMA GLOBULIN USING SILICEOUS MATERIAL SUCH AS SILICA GEL

This is a continuation-in-part of Ser. No. 812,404, filed Apr. 1, 1969 now abandoned.

Acrinol, otherwise 6,9-diamino-2-ethoxyacridine lactate monohydrate, is available commercially from various sources including Calbiochem, Box 54282, Los Angeles, Cal. 90054, Pierce Chemical Co., Rockford, Ill. and Winthrop Laboratories, 90 Park Avenue, New York, N. Y. 10016. It is used in blood protein fractionation work to separate blood proteins, especially because of its characteristic in leaving behind in solution virtually all $\gamma$-globulins. Sagan, Z., Clin. Chim. Acta 21, 225 (1968); Saifer, A and Lipkin, L. E., Proc. Soc. Expl. Biol. Med. 102, 220 (1959). Notwithstanding the advantageous property of acrinol in beneficially separating blood proteins, the removal therefrom, especially from gamma globulin, has presented considerably difficulty in the prior art. Illustratively, M. Matthaeus and D. Matheka in Zentr. Bakteriol. Parasitenk., Abt. 1, Orig 188, 6 (1963) describe laborious and unsuccessful attempts to remove residual acrinol by precipitation with salts. Sutton and Karp in Biochimica Biophysica Acta 107, 154 (1965) refer to the removal of acrinol by adsorption on charcoal. Illustrative of the latter process in the prior art is the use of charcoal in U.S. Pat. No. 3,383,227 (E. D. and M. J. West). However, Sutton and Karp, loc. cit. paragraph 2. describe the complexity of this problem and its nonresolution in the prior art by showing that loss of the desired product accompanies use of charcoal in the removal of acrinol. Bentonite purification of gamma globulin from placenta in U.S. Pat. No. 3,449,316 apparently obviates degradation but acrinol removal is not disclosed.

SUMMARY OF THE INVENTION

It has been found in accordance with the present invention that in the purification of blood proteins including blood gamma globulin and especially antilymphoid gamma globulin, wherein acrinol is used to separate various blood proteins, the acrinol can be removed from aqueous solutions of the desired proteins, including gamma globulin, especially antilymphoid gamma globulin, by contacting said solutions with an effective amount of silica gel or mineral silicate adsorbent for removal of the acrinol. In view of the characteristic yellow color of solutions containing acrinol, effectiveness of the adsorbent in advantageously removing the acrinol is relatively easily determined by absence of such characteristic color in the protein solutions and transfer of the color to the adsorbent. Optionally the presence of acrinol in a filtrate or supernatant after adsorbent treatment can be monitored by UV absorption at about 362 m$\mu$ and 268 m$\mu$. Also, in the process of the present invention advantageously beneficial removal of pyrogenic substances from the protein solutions accompanies the use of adsorbent. As is known in the art, pyrogenic substances are highly undesirable contaminants in pharmaceutical products, especially those for parenteral use, and their removal has sometimes been difficult and uncertain and in some instances actually not feasible, as see a publication by Baxter Laboratories, Inc., Morton Grove, Ill. "Bacterial Pyrogens, Particularly Pyrogenic Polysaccharides of Bacterial Origin, An Annotated Bibliography" (1952). Removal of any hepatitis virus which may be present is suggested in the prior art Bednarik et al., Zbl. f. Bakt. I. Orig. 200:1, 1966.

As described supra, acrinol effectively precipitates blood proteins from their aqueous solutions leaving unprecipitated some $\beta$-globulin and virtually all $\gamma$-globulins. Because of this property it is useful in purification of blood proteins from human blood and animal blood such as that from horses, sheep, goats, cows and rabbits. As is known in the art, both the serum obtained after clotting and the plasma obtained by removal of formed elements are sources of purified gamma globulin. As is also known in the art, beneficial gamma globulin fractions are prepared from human or animal blood which contains clinically desirable antibodies. For example, serum or plasma from humans who have undergone poliomyelitis or who have been inoculated with nonvirulent polio virus is advantageous for the preparation of human gamma globulin containing antipolio antibodies. Advantageously also, serum or plasma is prepared from the blood of animals, especially horses, which have been previously inoculated with lymphoid tissue, e.g., lymphocytic tissue from human sources including thymocytes and spleen lymphocytes.

To prepare lymphocytes, especially thymocytes for treatment of horses, rate zonal centrifugation is used to obtain separation of lymphocytes and platelets from granulocytes and erythrocytes. Thereafter, isopycnic zonal sedimentation is used to separate the lymphocytes from the platelets. In this manner a practically pure population of thymocytes is obtained for use in injection of horses in the known manners in the preparation of horse antihuman thymocyte serum or plasma.

Particularly useful sera and plasma of this type are exemplified by horse antihuman lymphoid serum and plasma, sheep antihuman lymphoid serum and plasma, and similar sera and plasma. From these sources purified gamma globulin is isolated and contains antilymphoid tissue antibodies beneficially useful as an immunosuppressant substance, for example in enhancing tolerance of homologous organ and skin transplants, for example, kidney, liver, heart, lung and skin in humans and like transplants in animals such as chimpanzees and rats.

Ordinarily the solution to which the adsorbent is applied for removal of traces of acrinol is an aqueous solution of purified gamma globulin, containing for example sodium chloride as electrolyte, from the aforesaid sources, especially purified gamma globulin from horse antihuman lymphoid serum or plasma. As aforesaid, the removal of the acrinol from the aqueous solution can be checked visibly by disappearance of the yellow color which is characteristic of the acrinol. Additionally, the presence of acrinol in aqueous solutions of purified gamma globulin from which the acrinol has been removed can be monitored by ultraviolet absorption measurements at 362 m$\mu$ ($a$=38.4) and 268 m$\mu$ ($a$=138). Silica gel adsorbents for use in the process of this invention are known in the art, being generally those sold for use in preparative and analytical chromatography. Illustratively, a suitable gel is that available from E. Merck A. G. Darmstadt, Germany. This variety consists essentially of particles of 0.05 to 0.12 mm. (70–325 mesh, American Society of Testing Materials standard). Other adsorbents are magnesium silicate, magnesium trisilicate, native calcium-magnesium silicate, talc, and a zeolite such as heulandite, stilbite, chabazite, analcite, and natrolite [Infra-Inorganic Chemistry, Latimer-Hildebrand, MacMillan, 1940] The amount of adsorbent is that effective for removing the traces of acrinol which remain in aqueous solutions of the purified gamma globulin.

DESCRIPTION OF THE PREFERRED EMBODIMENTS

In accordance with the manner and process of using this invention, an aqueous solution of acrinol containing from about 0.1 to about 5 percent by weight of the acrinol, preferably about 0.4 percent, is added slowly to the serum or plasma with stirring to precipitate blood proteins other than gamma globulin, especially $\alpha$- and $\beta$-globulins. The plasma or serum is at its normal pH of from about 7 to about 8 although it can be adjusted to about pH 7.6 by the addition of a suitable reagent such as sodium hydroxide or sodium hydrogen carbonate. The precipitation is usually done at about 25° C. although lower temperatures are operable. From 3.5 to 5 volumes, preferably about 4 volumes of the 0.4 percent acrinol solution is used for each volume of plasma or serum. Precipitation is allowed to go to completion with preceipitate settling and flocculation taking place during standing preferably at a temperature of about 4° C. for from about 15 minutes up to as long as overnight or longer. The precipitate is separated from the soluble portion, illustratively by filtration or centrifugation. The partially purified gamma globulin is present in the soluble portion. After pH adjustment to about 7.2 with 0.8 molar acetate buffer, as required, the γ-globulin is precipitated from the soluble portion by addition of acetone or a lower alkanol, for example, isopropanol or ethanol. Illustratively, isopropanol is added dropwise with stirring at 0°–6° C. to achieve a concentration of about 25 percent isopropanol v./v. Thereby precipitation of the gamma globulin occurs and after a suitable settling period at about 0° C., illustratively several hours or overnight, it is recovered by filtration or centrifugation. The precipitate of partially purified gamma globulin usually containing some acrinol as evidenced by a yellow coloration and sometimes containing pyrogenic substances is dissolved in a minimal volume of a suitable aqueous solvent, for example, 0.9 percent NaCl or 2.25 percent glycine. 0.01 M or 0.02 M sodium phosphate aqueous solution having a pH of about 6.7 provides a solution satisfactory for chromatography, as described infra. Thereafter the solution of the gamma globulin is applied to a small column of adsorbent or to a layer of adsorbent on a suitable bed, for example a coarse-fitted glass funnel. An additional adsorbent treatment may occasionally be required. Regarding operable ratios of adsorbent to purified gamma globulin it has been found that a satisfactory range is 1 g. of adsorbent to from about 0.5 to about 5 g. of gamma globulin, for example, completely satisfactory results are obtained when approximately 4 g. of silica gel in the form of a bed for filtration is used to remove acrinol from about 2 g. of purified gamma globulin in about 50 ml. of water. The so-prepared purified gamma globulin solution is found to be free of acrinol and also of pyrogens. It is preserved frozen or partially concentrated, preferably by removal of solvent from a frozen solution, and then preserved until used wither as a cold solution or as a freeze-dried product.

Adsorbent treatment can be combined with other purification steps or sequences of steps on, for example, horse antihuman lymphoid globulin for sue in humans as an immunosuppressant agent, for example, in counteracting the tendency of the host to reject organ transplants. Illustratively, after immunization of animals, for example horses, with human thymocytes, antierythrocyte antibodies are usually present in the animal serum or plasma. Such antibodies produced by antigens are removed by adsorption on mixed human red blood cells (types A, B, AB, O and Rh$^+$). Hence the gamma globulin rich solution remaining after acrinol treatment is treated with washed human erythrocytes or stroma, about one-twentieth to one-fifth volume, preferably about one-tenth volume and the resulting suspension is stirred gently for from 1 hour to 3 hours at 25° C. or lower. Erythrocytes or stroma are removed by suitable means, for example, filtration or centrifugation. As stated, to remove antierythrocyte antibodies, gamma globulin rich solution is treated with human erythrocyte stroma. Illustratively, human erythrocyte stroma that is free of serum proteins is prepared by the use of digitonin. Digitonin (0.5 ml. of a 5 mg./ml. suspension in 0.9 percent NaCl) is added to 10 ml. of a chilled 10 percent red cell suspension. Lysis occurs promptly and aggregation of stroma follows. Sedimentation is brought about at 34,000 g. for 30 minutes at about 50° C. Saline washings are used to remove traces of hemoglobin and digitonin and the stroma is used as an aqueous dispersion, for example in 0.9 percent NaCl aqueous solution usually in the ratio of 4 to 5 ml. erythrocyte equivalent in 1 ml. of final saline aqueous dispersion. Antierythrocyte titer of a globulin-containing supernatant is determined by common immunological agglutination assay techniques and where required, additional absorptions are carried out. Thereafter, the so treated globulin solution is precipitated with acetone or the lower alkanol as described supra, and the globulin is taken up in aqueous solution which is treated with the siliceous adsorbent to remove acrinol and pyrogens. An additional purification step comprises the treatment of the gamma globulin solution with an anion exchanger, for example, a column of diethylaminoethyl ether of cellulose, known in the art as diethylaminoethyl cellulose (DEAE Cellulose). The column is previously equilibrated with the solvent used to prepare the gamma globulin solution, preferably 0.01 to 0.02 molar sodium phosphate, pH about 6.7. After application of the gamma globulin solution to the column, elution follows with the same solvent and the elution is monitored by determinations of protein absorbancy at 280 m$\mu$. Column dimensions of 5 to 10 cm. in diameter and up to 80 cm. in height are used with flow rates of from about 120 to 480 ml. per hour. Those fractions showing significant absorbancies are checked for gamma globulin content by known immunological or electrophoretic tests. The gamma globulin is normally the first protein flowing through the column and transferrin tends to remain more tightly held. The gamma globulin is recovered, illustratively by precipitation with acetone or a lower alkanol as described supra, and the precipitate is separated. Further treatment involves drying in vacuo or freeze drying or alternatively the gamma globulin is dissolved in an aqueous vehicle suitable for parenteral administration, for example, 0.3 M glycine, sterilized by filtration and held in storage at 0°–4° C.

The following examples illustrate the manner and process of using this invention but are not to be construed as limitations thereof.

Example 1. — Gamma Globulin from Normal Horse Serum

To 100 ml. of normal horse serum 400 ml. of 0.4 percent aqueous acrinol is added dropwise with stirring over a period of about 30 minutes. The mixture is then allowed to settle at about 4° C. for approximately 4 hours. Filtration yields an insoluble portion which is discarded and a soluble portion to which 167 ml. of isopropanol (temperature −20° C.) for 4 hours. After this period of settling and flocculation the mixture is centrifuged for 10 minutes at 2,000 r.p.m. The supernatant liquid is poured off and discarded. Thirty milliliters of 2.25 percent aqueous glycine is used to dissolve the material precipitated in the 25 percent isopropanol precipitation mixture. This solution is filtered through a bed of silica gel poured in water (2-centimeters diameter by 2.7-centimeters height). The insoluble material is washed on the filter with 5 ml. of additional glycine solution and 10 ml. of water. The filtrate is frozen and dried from the frozen state, the dry yield being 2.53 g. of which about 788 mg. is calculated to by glycine; the remainder 1.74 g. being gamma globulin. This gamma globulin is free from pyrogenic substances when tested according to the test for pyrogens of the Food and Drug Administration 141A.3.

Example 2 — Silica gel Treatment 4000 ml. of aqueous gamma globulin solution in 0.01 M phosphate buffer, pH 6.7 is treated with silica gel. 500 g. of silica gel is poured as a slurry in water to prepare a column 10 cm. × 14 cm. The aqueous gamma globulin solution is passed thru the column and the column is washed with additional buffer. The filtrate and washings, 6,600 ml., are free of acrinol. The globulin is of horse antihuman thymocyte source.

Example 3 — Silica gel treatment 2000 ml. of aqueous γ-globulin solution in 0.01 M phosphate buffer, pH 6.7, is treated with 500 g. of silica gel poured as an aqueous slurry. The column of silica gel is 10 cm. ×14 cm. The gel is washed with an additional amount of the buffer. The filtrate and washings, 2,800 ml., are free of acrinol. Globulin is of horse antihuman thymocyte source.

Example 4 — Silica gel treatment

As in examples 2 and 3, 3,000 ml. of aqueous γ-globulin solution is treated with 600 g. of silica gel. The filtrate and washings are free of acrinol.

Example 5 — Diethylaminoethyl cellulose treatment

The combined filtrate and washings of example 2, 6,600 ml. are passed over a column of diethylaminoethyl cellulose (wet volume is 10,550 ml.). The flow rate is 120 ml./hr. After 3,080 ml. of eluate has passed through the column the next 7,870 ml. is collected to recover the purified gamma globulin by precipitation at an ethyl alcohol concentration of 25 percent v./v.

Example 6 — Diethylaminoethyl cellulose treatment

The combined filtrates and washings of examples 3 and 4 (6,610 ml.) are passed over a column of diethylaminoethylcellulose (wet volume 14,970 ml.). The flow rate is 120 ml. per hour. After 7,770 ml. of eluate have passed through the column the nest 9,410 ml. is collected to recover the purified gamma globulin by precipitation at an ethyl alcohol concentration of 25 percent v./v.

Example 7 — Recovery of Purified Gamma Globulin from Eluate

The combined gamma globulin-containing eluates of examples 5 and 6 are precipitated at a 25 percent concentration v./v. of ethanol by adding 6,516 ml. of 95 percent ethanol, the precipitation being at temperature of about 0° C. After standing at −5° overnight the mixture is centrifuged for recovery of the insoluble purified gamma globulin, the supernatant liquor being discarded. 167.4 g. of purified gamma globulin of horse antihuman thymocyte plasma are thereby obtained.

Example 8 — Acrinol and Stroma Treatments 5,675 ml. of horse antihuman thymocyte plasma is adjusted to a pH of 7.6 with 350 ml. of 0.9 M sodium bicarbonate, the bicarbonate being added slowly with stirring. To the adjusted plasma 24,100 ml. of 0.4 percent acrinol aqueous solution is added slowly with stirring. The precipitation mixture is allowed to stand overnight in the refrigerator at about 4° C. After this period of standing, the precipitate has flocculated well and the mixture is separated readily into insoluble and soluble portions. The filtrate is adjusted to pH 7.2 with acetate buffer 0.8 M. 113.5 ml. of an aqueous slurry of stroma in 0.9 percent sodium chloride aqueous solution is added and the whole is stirred for approximately 3 hours at room temperature. The mixture is allowed to stand overnight at refrigerator temperature, and is then filtered. The residue is discarded and the filtrate is again treated with 113.5 ml. of aqueous stroma slurry in 0.9 percent sodium chloride. Filtration is repeated and the hemagglutination titer at this point is 1 to 2.

Example 9

Following the procedure of example 8, 1,875 ml. of horse antihuman thymocyte plasma is adjusted to pH 7.6 ml. of 0.4 percent aqueous acrinol is added slowly with stirring and the precipitation mixture is allowed to stand. After complete flocculation the mixture is filtered and the residue is discarded. The filtrate is adjusted to pH 7.2 with acetate buffer 0.8 M. A 37.5 ml. of slurried stroma are used for the first adsorption of undesirable antibodies and after filtration the stroma treatment is repeated with another 37.5 ml. of slurried stroma. At this time the hemagglutination titer is 1 to 2.

Example 10

The combined acrinol-treated, stroma-treated filtrates of low titer obtained in examples 8 and 9 are combined for precipitation of the purified gamma globulin with isopropanol. Precooled isopropanol, 12,666 ml., temperature about −20° C. is added to the combined filtrates. The temperature of the precipitation mixture is gradually lowered to −5° C. The concentration of isopropanol in the precipitation mixture is then 25 percent v./v. After standing overnight at −5° C. centrifugation at 2,000 r.p.m. for 10 minutes separates the gamma globulin precipitate from the supernatant which is discarded. The precipitate is leached with a minimal volume of 0.01 M phosphate buffer of pH 6.7 and the solution is centrifuged at 2,000 r.p.m. for about 10 minutes. The residue is discarded and the filtrate is used for subsequent experiment in passage over silica gel to remove traces of acrinol and pyrogen.

Example 11 — Acrinol Precipitation and Stroma Treatment 4,300 ml. of horse antihuman thymocyte plasma is adjusted to pH 7.6 with 128 ml. of 0.9 M sodium bicarbonate. With stirring 17,712 ml. of 0.4 percent aqueous acrinol is added and the precipitation mixture is allowed to stand for 8 hours at about 4° C. After this period of standing filtration readily separates the residue which is discarded. The filtrate is adjusted to pH 7.2 with acetate buffer 0.8 M. 86 ml. of red blood cell stroma are added for the removal of erythrocyte antibodies. After filtration the stroma treatment is repeated with 108 ml. of slurried stroma. After filtration the hemagglutination titer is found to be 0. The solution is cooled to 0° C. and the pH adjusted to 7.2 with acetate buffer. 7,033 ml. of isopropanol are added as in the other examples to obtain a precipitate of the purified gamma globulin which is dissolved in 2.1 of 0.01 M phosphate buffer, pH 6.7 for further treatment with silica gel and diethylaminoethylcellulose.

Example 12 — Gamma Globulin from Goat Antirat Serum

To 210 ml. goat antirat serum at pH 7.65 840 ml. of 0.4 percent aqueous acrinol is added dropwise over a period of about 30 minutes. The mixture is then allowed to settle at about 4° C. for approximately 4 hours. Centrifugation yields an insoluble portion which is discarded and a soluble portion to which (cooled to 0° C.) 350 ml. of isopropanol (−20° C.) is added dropwise, the temperature remaining at about 0° to −5° C. The mixture is allowed to stand at about 0° C. overnight. After this period of flocculation the mixture is centrifuged for 10 minutes at 2,000 r.p.m. at about 5° C. The supernatant liquid is poured off and discarded. The insoluble portion is leached with 0.15 M sodium chloride solution to dissolve the material precipitated in the 25 percent isopropanol precipitation mixture. This solution is filtered through a 12 ml. bed of silica gel poured in ml. M sodium chloride solution on a 15 ml. coarse-sintered glass funnel. After filtering the solution the silica gel is washed on the funnel with 5 ml. 0.15 M sodium chloride solution. The total volume of filtrate and washings is 52.5 ml. The gamma globulin fraction contains 2.625 g. as determined by O.D. at 280 mm. It is free of acrinol.

Example 13 — Treatment with Magnesium Silicate

Following the procedure of example 2 but substituting 500 g. of magnesium silicate for the 500 g. of silica gel, equally beneficial removal of acrinol is obtained.

Example 14 — Treatment with Magnesium Trisilicate

Following the procedure of example 3 but substituting 500 g. of magnesium trisilicate for the 500 g. of silica gel, equally beneficial removal of acrinol is obtained Example 15 — Treatment with Calcium-magnesium Silicate Following the procedure of example 4 but substituting 600 g. of native calcium-magnesium silicate for the 600 g. of silica gel, equally beneficial removal of acrinol is obtained.

Example 16 — Treatment with Magnesium Silicate

Following the procedure of example 12 but substituting magnesium silicate for the silica gel, equally beneficial removal of acrinol is obtained.

Example 17 — Silica Gel Treatments 2,000 ml. human plasma (hemophylic factor free), pH 7.3, is adjusted to pH 7.6 by the addition of 33 ml. of 0.8 M NaHCO$_3$. 8 liters of 0.4 percent aqueous acrinol solution is added with stirring and mixture is refrigerated overnight. The supernatant liquid is decanted, volume 9,680 ml., total solids content of p.p.t. 307.8 g. wet weight. It is divided into equal aliquots, 4,840 ml. each, aliquots 1 and 11.

Treatment of Aliquot I

The aliquot is poured slowly through a bed of about 200 g. silica gel on a fritted-glass filter funnel with water washing. Total volume 5,050 ml. It is free of acrinol. Cool to 0° C. pH 6.9. Adjust to pH 7.2 with 0.8 M NaHCO$_3$ solution. 1,802.5 ml. of 95 percent ethanol is added and the mixture is refrigerated at −5° C overnight. The clear supernatant is poured off and discarded. The remaining suspension is centrifuged in the cold and the supernatant is discarded. The precipitate is taken up in 100 ml. of 0.3 M glycine. The pH is adjusted to 6.8 by addition of 0.1 M acetic acid; the precipitate dissolves completely. The total volume is 161 ml. The solution is freeze dried to yield 8.87 g. solids, consisting of 6.62 g. of human gamma globulin and 2.25 g. glycine.

Treatment of Aliquot II

The aliquot, pH 7.75 is adjusted to pH 7.2 with 0.1 M acetic acid. 1727.5 ml. of cold 95 percent ethanol is added slowly with stirring and the mixture is refrigerated at −5° C. overnight. C. clear supernatant liquid is decanted and discarded. The remaining suspension is centrifuged and the supernatant is discarded. The precipitate is held under vacuum to remove residual ethanol, and then taken up in 600 ml. of 0.01 M potassium phosphate buffer pH 6.8. The resulting solution is passed through a bed containing 450 ml. of diethylaminoethylcellulose and then through a bed containing about 200 g. of silica gel. Total volume with water washes, 1,500 ml. It is free of acrinol. Protein (by $OD_{278}$) is 6.375 g. The pH is 7.2 Cool to 0° and add 535 ml. of 95 percent ethanol. After overnight refrigeration the mixture is centrifuged and the supernatant is discarded. The precipitate is dissolved in 100 ml. of 0.3 M glycine. The pH is adjusted to 6.8 with 0.1 M acetic acid. The mixture is centrifuged and the supernatant liquid is freeze dried to yield 8.27 g. solids, consisting of 6.02 g. human gamma globulin and 2.25 g. glycine.

Example 18 — Treatment with other adsorbents

Equally beneficial process results in removing acrinol are obtained by substituting in the above examples equal amounts of talc or a zeolite or natrolite, which are mineral silicates listed on page 305 of *Reference Book of Inorganic Chemistry*, W. M. Lattimer and J. H. Hildebrand, Revised Edition, The MacMillan Company, 1940.

I claim:
1. In a process of purifying proteins of blood serum or plasma wherein acrinol is used to separate γ-globulin from other proteins the method of removing acrinol from an aqueous solution of the γ-globulin in which consists essentially of (a) contacting said solution with an effective amount for absorbing the acrinol of a member selected from the group consisting of silica gel, magnesium silicate, magnesium trisilicate, native calcium-magnesium silicate, talc, heulandite, stilbite, chabazite, analcite, and natrolite, and (b) separating the member from the solution.

2. The process of claim 1 wherein the serum or plasma is that of an animal treated with lymphoid tissue of human origin.

3. The process of claim 1 wherein the serum or plasma is from a horse treated with human thymocytes.

4. The process of claim 1 wherein the adsorbent is silica gel.

5. The process of claim 1 wherein the serum or plasma is of human origin.

6. A process of purifying γ-globulin from serum or plasma consisting essentially of:
  1. separating from plasma or serum at a pH of from 7 to 8 an insoluble portion by adding to the serum or plasma from about 3.5 to about 5 volumes of 0.4 percent acrinol aqueous solution and recovering the soluble portion;
  2. mixing with said soluble portion at a pH of from about 7 to about 8 human erythrocyte stroma or erythrocytes and recovering the soluble portion;
  3. precipitation gamma globulin from the soluble portion at a pH of from about 7 to about 8 by adding thereto a sufficient quantity of acetone or a lower alkanol to provide an acetone or lower alkanol concentration of from about 20 percent to about 30 percent v./v. and recovering the precipitate;
  4. dissolving the precipitated gamma globulin in phosphate buffer at a pH of from about 6.5 to about 7.5 and treating the resulting solution with silica gel and recovering the soluble portion;
  5. passing the soluble portion over diethylaminoethyl cellulose equilibrated with phosphate buffer at about pH 6.7 and eluting the diethylaminoethyl cellulose with phosphate buffer at about pH 6.7; and
  6. recovering gamma globulin from the eluate in accordance with measurements of adsorbancies at 280 µ.

7. The process of claim 6 wherein the serum or plasma is that of an animal treated with lymphoid tissue of human origin.

8. The process of claim 6 wherein the serum or plasma is from a horse treated with human thymocytes.

9. The process of claim 6 wherein the serum or plasma is of human origin.

UNITED STATES PATENT OFFICE
CERTIFICATE OF CORRECTION

Patent No. 3,607,857      Dated September 21, 1971

Inventor(s) John W. Nelson

It is certified that error appears in the above-identified patent and that said Letters Patent are hereby corrected as shown below:

Column 1, line 36, "has been" should read --has now been--.
Column 2, line 71, "preceipitate" should read --precipitate--.
Column 3, line 33, "wither" should read --either--. Column 3, line 37, "sue" should read --use--. Column 3, line 59, "$50°C.$" should read --$5°C.$--. Column 4, lines 27-30, "Filtration yields an insoluble portion which is discarded and a soluble portion to which 167 ml. of isopropanol (temperature $-20°C.$) for 4 hours" should read --Filtration yields an insoluble portion which is discarded and a soluble portion to which 167 milliliters of isopropanol (temperature $-20°C.$) is added dropwise, the temperature of the mixture remaining at about $0°C$. The mixture is allowed to settle at about $0°C.$ for 4 hours.--. Column 5, line 5, "nest" should read --next--. Column 5, line 39, "7.6 ml. of 0.4 percent aqueous acrinol is added slowly with stirring and the precipitation mixture is allowed to stand." should read --7.6 with 87 ml. of 0.9 $\underline{M}$ sodium bicarbonate. Thereafter 7,848 ml. of 0.4% aqueous acrinol is added slowly with stirring and the precipitation mixture is allowed to stand.--. Column 5, lines 43,44, "0.8 M. A 37.5 ml." should read -- 0.8 $\underline{M}$. 37.5 ml. --. Column 6, line 5, "2.1" should read --2 1.--. Column 6, line 23, "in ml. $\underline{M}$ sodium" should read --in 0.15 $\underline{M}$ sodium--. Column 6, line 36, "obtained" should read --obtained.--. Column 6, line 48, "8" should read --Eight--. Column 6, line 51, "p.p.t." should read --ppt.--. Column 6, line 72, "C. clear" should read --The clear--. Column 7, line 5 "7.2 Cool" should read --7.2. Cool--. Column 7, line 16, "zeolite or natrolite, which" should read --zeolite such as heulandite, stilbite, chabazite, analcite, or natrolite, which--. Column 7, line 24, "$\gamma$-globulin in which" should read --$\gamma$-globulin which--. Column 8, line 12, "precipitation" should read --precipitating--.

Signed and sealed this 5th day of December 1972.

(SEAL)
Attest:

EDWARD M. FLETCHER, JR.
Attesting Officer

ROBERT GOTTSCHALK
Commissioner of Patents